(12) United States Patent
Slotnick

(10) Patent No.: US 12,599,116 B2
(45) Date of Patent: Apr. 14, 2026

(54) ENVIRONMENTAL TREATMENT DISTRIBUTION SYSTEMS AND METHODS

(71) Applicant: Lillianah Technologies Inc., Spring, TX (US)

(72) Inventor: Benjamin Sidney Slotnick, Spring, TX (US)

(73) Assignee: Lillianah Technologies Inc., Spring, TX (US)

( * ) Notice: Subject to any disclaimer, the term of this patent is extended or adjusted under 35 U.S.C. 154(b) by 598 days.

(21) Appl. No.: 18/156,006

(22) Filed: Jan. 18, 2023

(65) Prior Publication Data

US 2023/0225300 A1 Jul. 20, 2023

Related U.S. Application Data

(60) Provisional application No. 63/425,302, filed on Nov. 14, 2022, provisional application No. 63/301,488, filed on Jan. 20, 2022.

(51) Int. Cl.
| | |
|---|---|
| *A01K 63/00* | (2017.01) |
| *A01K 63/04* | (2006.01) |
| *C02F 1/00* | (2023.01) |
| *C02F 1/68* | (2023.01) |

(52) U.S. Cl.
CPC .............. *A01K 63/04* (2013.01); *C02F 1/687* (2013.01); *C02F 2209/006* (2013.01)

(58) Field of Classification Search
CPC ........ A01K 63/04; A01K 61/00; C12M 21/02
See application file for complete search history.

(56) References Cited

U.S. PATENT DOCUMENTS

| | | | |
|---|---|---|---|
| 6,056,919 A | 5/2000 | Markels, Jr. | |
| 7,736,509 B2 * | 6/2010 | Kruse | C02F 3/348 |
| | | | 210/906 |
| 11,690,309 B2 * | 7/2023 | Zito, Jr. | B63B 22/26 |
| | | | 239/11 |
| 2002/0023593 A1 * | 2/2002 | Markels, Jr. | A01G 15/00 |
| | | | 119/231 |
| 2010/0105129 A1 | 4/2010 | Sanchez-Pina et al. | |

(Continued)

FOREIGN PATENT DOCUMENTS

| | | | |
|---|---|---|---|
| AU | 2008100189 A4 | 4/2008 | |
| EP | 1508272 A1 * | 2/2005 | ............. A01K 61/00 |

(Continued)

OTHER PUBLICATIONS

English translation of JP 2013158252 to Yamaguchi et al, generated 2025.*

(Continued)

*Primary Examiner* — Nathan A Bowers
(74) *Attorney, Agent, or Firm* — Fletcher Yoder, P.C.

(57) ABSTRACT

An environmental treatment distribution system is provided that includes one or more nutrient containers and/or one or more bioreactors. The environmental treatment distribution system activates distribution of nutrients from the one or more nutrient containers and/or distribution of organisms from the one or more bioreactors. The environmental treatment distribution system may be used in conjunction with aquatic or aerial vessels to provide environmental treatment to bodies of water.

20 Claims, 10 Drawing Sheets

(56) References Cited

U.S. PATENT DOCUMENTS

| | | | | |
|---|---|---|---|---|
| 2011/0168100 | A1* | 7/2011 | Hogoy | A23K 10/22 |
| | | | | 426/281 |
| 2011/0282773 | A1* | 11/2011 | Gray, III | C05D 9/02 |
| | | | | 705/37 |
| 2013/0006445 | A1 | 1/2013 | Hine | |
| 2015/0017216 | A1* | 1/2015 | Harel | A61P 31/04 |
| | | | | 424/407 |
| 2015/0196002 | A1 | 7/2015 | Friesth | |
| 2023/0301280 | A1* | 9/2023 | Aljapur | G06T 7/13 |

FOREIGN PATENT DOCUMENTS

| | | | | |
|---|---|---|---|---|
| JP | 2013158252 | A | 8/2013 | |
| WO | 2004057963 | A1 | 7/2004 | |
| WO | 2009062097 | A1 | 5/2009 | |
| WO | WO-2020046523 | A1 * | 3/2020 | A01K 61/60 |

OTHER PUBLICATIONS

Treguer, Paul, et al.; "Influence of diatom diversity on the ocean biological carbon pump," Nature Geoscience, vol. 11, No. 1, 2018, pp. 27-37.

Lopez, Pascal, et al.; "Prospects in diatom research," Current Opinion in Biotechnology, Science Direct, vol. 16, 2005, pp. 180-186.

Malviya, Shruti, et al.; "Insights into global diatom distribution and diversity in the world's ocean," PNAS, Feb. 29, 2016, 10 pgs.

Armbrust, E. Virginia; "The life of diatoms in the world's oceans," Nature, vol. 459, May 14, 2009, 8 pgs.

Obata, Toshihiro, et al.; "The Central Carbon and Energy Metabolism of Marine Diatoms," Metabolites, 2013, 3, pp. 325-346.

Bowler, Chris, et al.; "Oceanographic and Biogeochemical Insights from Diatom Genomes," Annual Review of Marine Science, vol. 2, 2010, pp. 333-365.

Rosenberg, Julian N., et al.; "A green light for engineered algae: redirecting metabolism to fuel a biotechnology revolution," Current Opinion in Biotechnology, vol. 19, 2008, pp. 430-436.

Behrenfeld, Michael J., et al.; "Thoughts on the evolution and ecological niche of diatoms," Ecological Monographs, vol. 91, No. 3, 2021, 25 pgs.

Daneshvar, Ehsan, et al.; "Biologically-mediated carbon capture and utilization by microalgae towards sustainable CO2 biofixation and biomass valorization—A review," Chemical Engineering Journal, vol. 427, 2022, 15 pgs.

Sclarsic, Sarah Mary Haiken; "A Bioengineering Roadmap for Negative Emissions Technologies," Massachusetts Institute of Technology, 2021, 59 pgs.

"A Research Strategy for Ocean-based Carbon Dioxide Removal and Sequestration," National Academies of Sciences, Engineering, and Medicine, 2022.

Lynch, Michael, et al.; "Evolutionary scaling of maximum growth rate with organism size," Scientific Reports, vol. 12, 2022, 12 pgs.

Zeebe, Richard E., et al.; "CO2 in Seawater: Equilibrium, Kinetics, Isotopes," Elsevier Oceanography Series, 65, 2001.

Egge, J. K., et al.; "Silicate as regulating nutrient in phytoplankton competition," Marine Ecology Progress Series, vol. 83, Jul. 16, 1992, pp. 281-289.

Burson, Amanda, et al.; "Competition for nutrients and light: testing advances in resource competition with a natural phytoplankton community," Ecology, vol. 99, No. 5, 2018, pp. 1108-1118.

Gattuso, Jean-Pierre, et al.; "Light availability in the coastal ocean; impact on the distribution of benthic photosynthetic organisms and contribution to primary production," Biogeosciences Discussions, vol. 3, No. 4, 2006, pp. 895-959.

Uitz, Julia, et al.; "Phytoplankton class-specific primary production in the world's oceans: Seasonal and interannual variability from satellite observations," Global Biogeochemical Cycles, vol. 24, 2010, 19 pgs.

Dortch, Quay; "The interaction between ammonium and nitrate uptake in phytoplankton," Marine Ecology Progress Series, vol. 61, Mar. 8, 1990, pp. 183-201.

Naselli-Flores, Luigi, et al.; "Shape and size in phytoplankton ecology: do they matter?" Hydrobiologia, vol. 578, 2007, pp. 157-161.

Iversen, M. H., et al.; "Ballast minerals and the sinking carbon flux in the ocean: carbon-specific respiration rates and sinking velocity of marine snow aggregates," Biogeociences, vol. 7, Sep. 7, 2010, pp. 2613-2624.

De La Rocha, Christina L., et al.; "Interactions between diatom aggregates, minerals, particulate organic carbon, and dissolved organic matter: Further implications for the ballast hypothesis," Global Biogeochemical Cycles, vol. 22, 2008, 10 pgs.

Furnas, Miles J.; "In situ growth rates of marine phytoplankton: approaches to measurement, community and species growth rates," Journal of Plankton Research, vol. 12, No. 6, 1999, pp. 1117-1151.

Kroon, Bernd M., et al.; "From electron to biomass: A mechanistic model to describe phytoplankton photosynthesis and steady-state growth rates," Journal of Phycology, vol. 42, 2006, pp. 593-609.

Cappellen, Philippe Van; "Biomineralization and Global Biogeochemical Cycles," Reviews in Mineralogy and Geochemistry, vol. 54, No. 1, 2003, pp. 357-381.

Ingalls, Anitra E., et al.; The role of biominerals in the sinking flux and preservation of amino acids in the Southern Ocean along 170 W, Deep-Sea Research Part II, vol. 50, 2003, pp. 713-738.

Ploug, Helle; "Small-scale oxygen fluxes and remineralization in sinking aggregates," Limnology and Oceanography, vol. 46, No. 7, 2001, pp. 1624-1631.

Li, Futian, et al.; "Diatom performance in a future ocean: interactions between nitrogen limitation, temperature, and CO2-induced seawater acidification," ICES Journal of Marine Science, vol. 75, No. 4, 2018, pp. 1451-1464.

Smith-Harding, Tamsyne Jade; "The Role of the Silica Frustule in Diatom Carbon Acquisition and Photosynthesis," Flinders University, Nov. 2018, 150 pgs.

Allen, John T., et al.; "Diatom carbon export enhanced by silicate upwelling in the northeast Atlantic," Nature, vol. 437, Sep. 29, 2005, 5 pgs.

Valenzuela, Jacob J., et al.; "Ocean acidification conditions increase resilience of marine diatoms," Nature Communications, vol. 9, 2018, 10 pgs.

International Search Report and Written Opinion for PCT Application No. PCT/US2023/011164, Mailed May 19, 2023, 14 pgs.

* cited by examiner

ENVIRONMENTAL TREATMENT DISTRIBUTION SYSTEMS AND METHODS

CROSS-REFERENCES TO RELATED APPLICATIONS

This application claims priority to and the benefit of U.S. Provisional Application No. 63/301,488, entitled "System to efficiently distribute materials into volumes of water," filed Jan. 20, 2022, and to U.S. Provisional Application No. 63/425,302, entitled "System to efficiently distribute materials into volumes of water," filed Nov. 14, 2022, which are hereby incorporated by reference herein in their entireties for all purposes.

FIELD OF DISCLOSURE

The present disclosure relates generally to environmental treatment techniques. More specifically, embodiments of the present disclosure relate to systems and methods to distribute compositions into volumes of water, such as aquatic and/or marine environments.

BACKGROUND

The oceans are vast bodies of water covering 70 percent of the surface of Earth. A wide variety of marine life including plants and animals live throughout the oceans. Many parts of the oceans have the potential to harbor more, or different, types of life than they currently do. In these areas, quantity of living organisms, total biomass, and/or biodiversity is limited by low concentrations or a complete absence of specific nutrients and/or materials. Many approaches have been proposed and/or attempted to alleviate these conditions, either temporarily or permanently, but these approaches are not entirely effective or are prohibitively expensive.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, an environmental treatment distribution system is provided that includes a plurality of nutrient containers; one or more environmental sensors configured to generate environmental condition data associated with a location; and a controller. The controller operates to receive the environmental condition data and generate instructions to distribute nutrients from one or more of the plurality of nutrient containers at or near the location based on the environmental condition data.

In addition, in certain embodiments, an environmental treatment distribution method is provided that includes the steps of receiving operation data of an aquatic vessel; receiving sensor data indicative of environmental conditions associated with the aquatic vessel; activating distribution of nutrients, organisms, or both, from the aquatic vessel based on the sensor data, the operation data, or both; and terminating distribution of nutrients, organisms, or both, from the aquatic vessel based on the sensor data, the operation data, or both.

In addition, in certain embodiments, an environmental treatment distribution system is provided that includes a bioreactor. The bioreactor includes an air inlet, an environmental water inlet that can permit entry of environmental water with background nutrient source, a white or ambient light source, e.g., containing wavelengths of the visible spectrum suitable for aquatic organism growth, and an outlet. The environmental treatment distribution system includes one or more environmental sensors configured to generate environmental condition data associated with a location and a controller that operates to receive the environmental condition data and generate instructions to distribute contents of the bioreactor from the outlet based on the environmental condition data.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
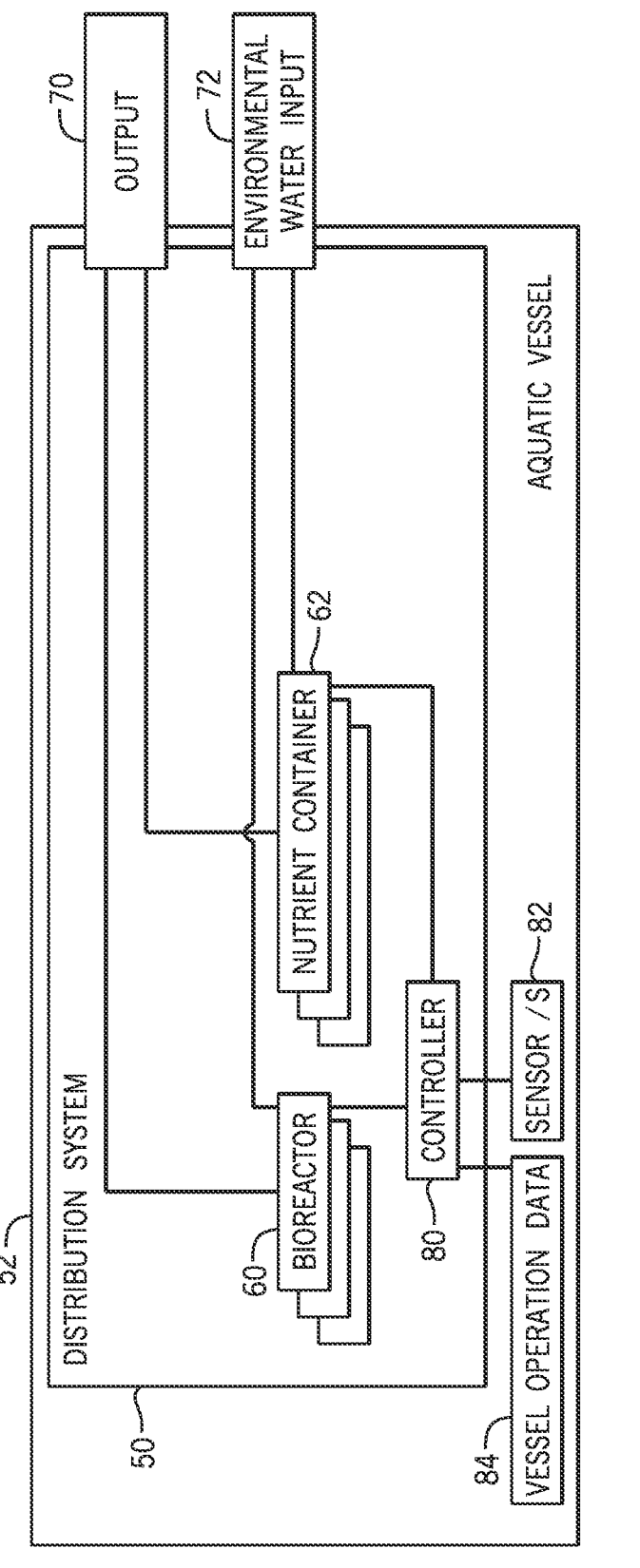
FIG. 1 is a schematic illustration of an environmental treatment distribution system of an aquatic vessel, in accordance with embodiments the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Provided herein are environmental treatment distribution techniques that promote the intentional change of conditions of aquatic environments (e.g., coastal marine, nearshore marine, open ocean, deep ocean and/or lakes, ponds, rivers, streams, bays, wetlands and estuaries), via controlled distribution of materials such as nutrients and/or beneficial organisms, such as phytoplankton or microalgae (such as but not limited to diatoms and/or coccolithophorids), into aquatic environments. Further, dispersion and/or fertilization techniques of nutrients and/or organisms facilitate the increase and/or decrease of relative and/or absolute abundance of various aquatic organisms to achieve desired changes in relative and/or absolute abundance of various aquatic organisms, and/or to achieve other desired outcomes. The introduction of these organisms and/or materials and/or media may be entirely or partially intended to induce an effect, condition, change, lack of change, or stasis in an aquatic environment or in an environment, ecology, place, or system impacted by an aquatic environment. The changes may be local, regional, or systemic.

In certain embodiments, the disclosed environmental treatment distribution system operates to decrease aquatic hypoxia, increase aquatic oxygenation, increase export of materials to depth, enhance fisheries. In certain embodiments, the disclosed environmental treatment distribution system operates to treat harmful algal bloom, red tide, nutrient runoff, climate change, eutrophication, fisheries related to fishing, and/or environmental changes associated with commercial presence. In certain embodiments, the disclosed environmental treatment distribution system operates to create conditions favorable to biologic growth and/or the capture of carbon dioxide or other carbon-based materials, elements, and/or molecules, with or without the intent to sequester said carbon for some period of time. In certain embodiments, the disclosed environmental treatment distribution system operates to create an algal bloom, and/or to create conditions favorable to other aquatic or non-aquatic life.

The disclosed environmental treatment distribution system operates to distribute materials, such as nutrients and/or plankton and/or other types of organisms. By way of example, dispersed nutrients may include, but are not limited to, silica, iron, cobalt, copper, aluminum, nitrogen, phosphorous, magnesium, manganese, calcium, sodium, potassium, and carbon, all in various forms and solutions. In an embodiment, the dispersed nutrients include volcanic ash or synthetic volcanic ash (e.g., volcanic ash in combination with one or more other nutrients or volcanic ash alone without other nutrients). In an embodiment, the dispersed nutrients and/or materials may include iron, phosphorous, nitrogen, phosphorous, and silica that may or may not be in elemental form, such as part of a different, larger, or more complex molecule.

Nutrients may be chosen due to their characteristics including but not limited to how they dissolve in different bodies and/or composition of water. Nutrients may be chosen based on visible characteristics including but not limited to grain size, grain density, grain sorting, grain morphology, solubility in water, and/or grain composition, and/or due to their chemistry including but not limited to their isotopic signature, adhesion, and surface energy components. These types of nutrients may originate from different sources, either from targeted mining practices and/or byproducts of needed industrial products that are all healthy, reasonably priced, and favorable to being introduced to aquatic environments (e.g., coastal marine, nearshore marine, open ocean, deep ocean and/or lakes, ponds, rivers, streams, bays, wetlands and estuaries).

The distributed materials as disclosed herein may include atoms, molecules, media, metals, fibers, compounds, and biological remains of organisms, including but not limited to biologic materials, silica, carbon, carbonates, hydroxides, specific elements (e.g., silicon, aluminum, calcium, magnesium, sodium), specific molecules, specific materials which are biologic in origin, specific organisms, and/or materials with specific chemical or physical properties including but not limited to surface adhesion, density, solubility in water, pH, molar mass, and/or odor. The distributed materials may be reaction endpoints, reaction intermediates, or byproducts of other industrial processes.

The distributed organisms may include one or more aquatic organisms. In an embodiment, the organisms may include one or more plankton types. These plankton may be of different or similar types, including but not limited to phytoplankton, zooplankton, autotrophs, diatoms, coccolithophorids, dinoflagellates, foraminifera, grazers, autotrophs, or otherwise. In an embodiment, the organisms include microalgae (phytoplankton) such as diatoms and coccolithophorids. These types of plankton and/or mixes of plankton may be chosen based on visible characteristics, or genetic characteristics, or other characteristics, any combination of characteristics, or chosen by algorithm, or chosen randomly, or chosen by some other process, or not chosen at all. These plankton may be chosen due to their characteristics in single-species populations or due to their characteristics when interacting with other organisms and/or to the water column.

Distributed organisms may include plankton and/other organisms created with biotechnology, genetic modification, gene editing, or other techniques that enable the change, creation, limitation, and/or increase in single or multiple traits, characteristics, behaviors, activities, growth rates, compositions, sinking rates, nutrient uptake, nutrient release, and/or interaction with other biologics or non-biologics throughout the water column. Distributed organisms may include organisms intentionally bred for specific characteristics, and/or species created and/or modified using processes which can alter their characteristics, genome, or other factors, such as but not limited to bioengineering, genetic modification, or gene editing.

Some characteristics of the distributed organisms may include but are not limited to: organism size related to biomass volume growth rates, marine biogenic calcification processes via calcifying organisms, competitive dominance within phytoplankton communities, large primary productivity contributor to oceans, light scattering vs absorption rates, defensive mechanisms from grazing activity, presence/absence of toxic species, ratio of nitrate to ammonium uptake, sunlight requirements, cell density and wall structure, cell morphology including but not limited to size, cell size, aggregate sinking speeds related to the presence of ballast material and/or calcite, bloom forming capabilities, species growth rates, efficiency of light conversion into biomass, sinking rates including but not limited to the presence of calcite and/or calcium carbonate plates and/or scales and/or silica or opal cell walls, whether remineralization process increases or decreases sinking rates, nutrient uptake and/or transport efficiency, carbon-fixing ability, carbon export ability, adaptability to changing $CO_2$ concentrations, ability to outcompete against other organisms, and/or how significant they are to primary productivity. The distributed organisms may be alive or not alive, preserved or not preserved, and/or may be cryogenically frozen.

The environmental treatment distribution system may operate to selectively distribute nutrients and organisms separately and/or together (e.g., simultaneously). Depending on the location of the aquatic system and composition of the water of that aquatic system, either a singular or a multitude of specific or a mix of phytoplankton species, either by themselves or as part of a mixture of themselves and other materials and/or media, are introduced into an aquatic environment (e.g., coastal marine, nearshore marine, open ocean, deep ocean and/or lakes, ponds, rivers, streams, bays, wetlands and estuaries). The organisms and/or nutrients may be introduced into the same aquatic environment as where the effect is induced, or they may be introduced into a different aquatic environment.

The disclosed environmental treatment distribution system may be incorporated onto aquatic vessels that may be dedicated vessels for environmental treatment or may be vessels with other commercial purposes (e.g., fishing). For example, passenger ships, cruise ships, ferries, commercial vessels under charter to move people, freight, commodities, and/or other vessels may also conduct environmental treatment as disclosed herein. The disclosed distribution system may be used in conjunction with maritime operating vessels and/or aircraft such as planes and/or helicopters, airborne and/or spaceborne and/or land-based vessels, equipment, containers, rail, ships, planes, drones, quadcopters, helicopters, jets, rockets, balloons, buoys, or other devices capable of distributing materials using the environmental distribution system as provided herein.

In one embodiment, bioreactors to grow and replenish desired organisms to be distributed may be implemented as part of a ballast tank or other container (e.g., marine holding tanks that can be for holding marine catch such as shrimp, crabs, or specific marine organisms) in which to grow photosynthetic organisms including in a way that would make the container or tank act as a photobioreactor or a fermentation system. The bioreactor or other components of the environmental treatment distribution system may be implemented in conjunction with existing ship or vessel systems, such as the bilge system or other water or fluid transfer systems. The bioreactor or other components of the environmental treatment distribution system may be towed by another ship or vessel. The environmental treatment distribution system may include mixing systems for mixing of nutrients with organisms grown on board, prior to and/or while the organisms and/or nutrients are being transported off the ship or vessel. These mixing systems may be configured to quantify, weigh, mix, move, aggregate, and/or distribute materials for dispersion into waters, on board a ship or vessel. One embodiment facilitates the mixing of nutrients with organisms which have not been grown on board, prior to and/or while the organisms and/or nutrients are being transported off the ship or vessel.

With the preceding in mind, FIG. 1 is a schematic illustration of an embodiment of an environmental treatment distribution system 50, also referred to as the distribution system 50, implemented with an aquatic vessel 52. The distribution system 50 may be, at least in part, disposed on, coupled to, attached to, placed on or in, or tethered to the vessel 52. In certain embodiments, the distribution system 50 may be arranged as part of an accessory vessel of a main vessel.

The distribution system 50 includes one or more bioreactors 60 that promote growth of one or more organisms. The one or more bioreactors 60 may include multiple bioreactors 60, and each individual bioreactor 60 may hold and promote growth conditions for a particular organism type. In one embodiment, the distribution system 50 includes multiple bioreactors 60 holding a same type of organism. In one embodiment, respective different bioreactors 60 hold different types of organisms. In addition, the distribution system 50 includes one or more nutrient containers 62. When multiple nutrient containers 62 are present, each may hold a same or different nutrient type or mix relative to other containers 62. The distribution system 50 includes at least one output 70 that is shaped and sized to transfer materials from the one or more bioreactors 60 and/or the one or more nutrient containers 62. In certain cases, each bioreactor 60 and container 62 is coupled to a respective dedicated output 70. In addition, the one or more bioreactors 60 and/or the one or more nutrient containers 62 may include vents to promote airflow. In another example, multiple bioreactors 60 and/or multiple nutrient containers 62 may share one output 70. In one example, each output 70 includes a conduit that is fluidically coupled to at least one of the one or more bioreactors 60 and/or the one or more nutrient containers 62. An outlet point of the at least one output 70 is positioned at or near an exterior of the vessel 52, such that materials distributed and exiting the output 70 are distributed on or in the water when the vessel 52 is operational or otherwise in the water.

The distribution system 50 also includes at least one environmental water input 72 that is arranged to transfer water or fluid from the environment (e.g., ocean water, sea water, river water) into the distribution system 50. For example, the transferred nutrient rich water from the environment and/or processed water (e.g., deionized or filtered) supplemented with nutrients onboard is provided to the bioreactor 60 as part of growth media and/or to replenish organism stocks. In another embodiment, environmental water is transferred as part of a mixing process for nutrients or dilution for bioreactor product, as generally discussed in more detail in FIG. 2. The environmental water may be preprocessed and/or supplemented with nutrients.

An individual bioreactor 60 as provided herein may include an air supply, a nutrient-rich water intake (e.g., the environmental water input 72), an outlet (e.g., the outlet 70), and white light source. The bioreactor housing is formed from durable materials that may be opaque or at least partially translucent or transparent to light. Further, the housing may be a single-layer or multi-layer housing. The light source may be internal or external, depending on the characteristics of the bioreactor housing. In one embodiment, the bioreactor housing is formed from an at least partially transparent material to permit light infiltration from an external light source. In an embodiment, the housing may include reflective material on inside or outside (at least partially covering interior or exterior walls) to enhance light transmission within the bioreactor 60. The reflective material may be applied to a PVC pipe forming a housing of the bioreactor 60. In one example, the housing may include an external shell that includes the light source and the reflective material, and the internal shell is a transparent structure that permits light infiltration and that contains the growing organism.

A size, shape, and fill level of the bioreactor 60 can be arranged to permit light infiltration from the external or internal light source within the contained body of water to promote organism growth. That is, the emitted light may reach or penetrate at least through a majority of the contained body of water or may have sufficient intensity at a central volume of water to permit healthy organism growth. In one example, bioreactor dimensions may be monitored for appropriate growth via sensors 82 (e.g., fluorometer (measuring phycocyanin, phycoerythrin, and chlorophyll)) positioned at desired locations within the bioreactor 60.

The distribution system 50 includes a controller 80 (e.g., electronic controller) that controls operations of components of the distribution system 50. For example, the controller 80 controls activation and cessation of distribution from the one or more bioreactors 60 and/or the one or more nutrient containers 62. The controller 80 also controls selection of individual bioreactors 60 and/or individual nutrient containers 62. In an embodiment, the controller 80 may also control bioreactor growth conditions. However, in other embodiments, each bioreactor 60 may include a separate controller that communicates with the controller 80 to provide bioreactor data that may be used to select an individual bioreactor 60 or determine if an individual bioreactor has grown sufficient levels of a desired organism to be distributed. Additional features of an example bioreactor 60 are discussed in greater detail in FIG. 3.

The controller 80 may receive input from one or more sensors 82 and operate responsive to sensor data, as generally discussed herein. The sensor/s 82 may include environmental sensors that generate environmental condition data, such as air or water temperature and pressure, wind direction and speed, water current direction and speed, salinity, humidity, turbidity, pH, pCO2, light, oxygen density, dissolved oxygen, conductivity, carbon dioxide, eDNA, anemometer, depth/altitude, nutrients, radiance and irradiance, fisheries echosounder, cameras (IR, VIS), sedimentation, hydrophone array, fluorometer (measuring phycocyanin, phycoerythrin, and chlorophyll) and chlorophyll concentrations 1. The sensors 82 may be positioned on or in the vessel 52 or on or in the distribution system 50 (e.g., coupled to the nutrient container 62 and/or the bioreactor 60). In certain embodiments, a water quality measurement check may be performed to assess the quality of the environmental water using a sensor 82 as provided herein.

In addition, the controller 80 may receive vessel operation data 84 (e.g., vessel speed, vessel location, vessel direction, estimated route) that is used as an input to control operations of the distribution system 50. As provided herein, the distribution system 50 may receive vessel operation data 84, may control operations of the aquatic vessel 52, and/or may provide input to a separate controller of the aquatic vessel 52.

The materials of various components of the system 50 may be selected for durability and to promote nutrient storage and/or organism growth and avoid foiling with undesired organisms.

Figure 2:
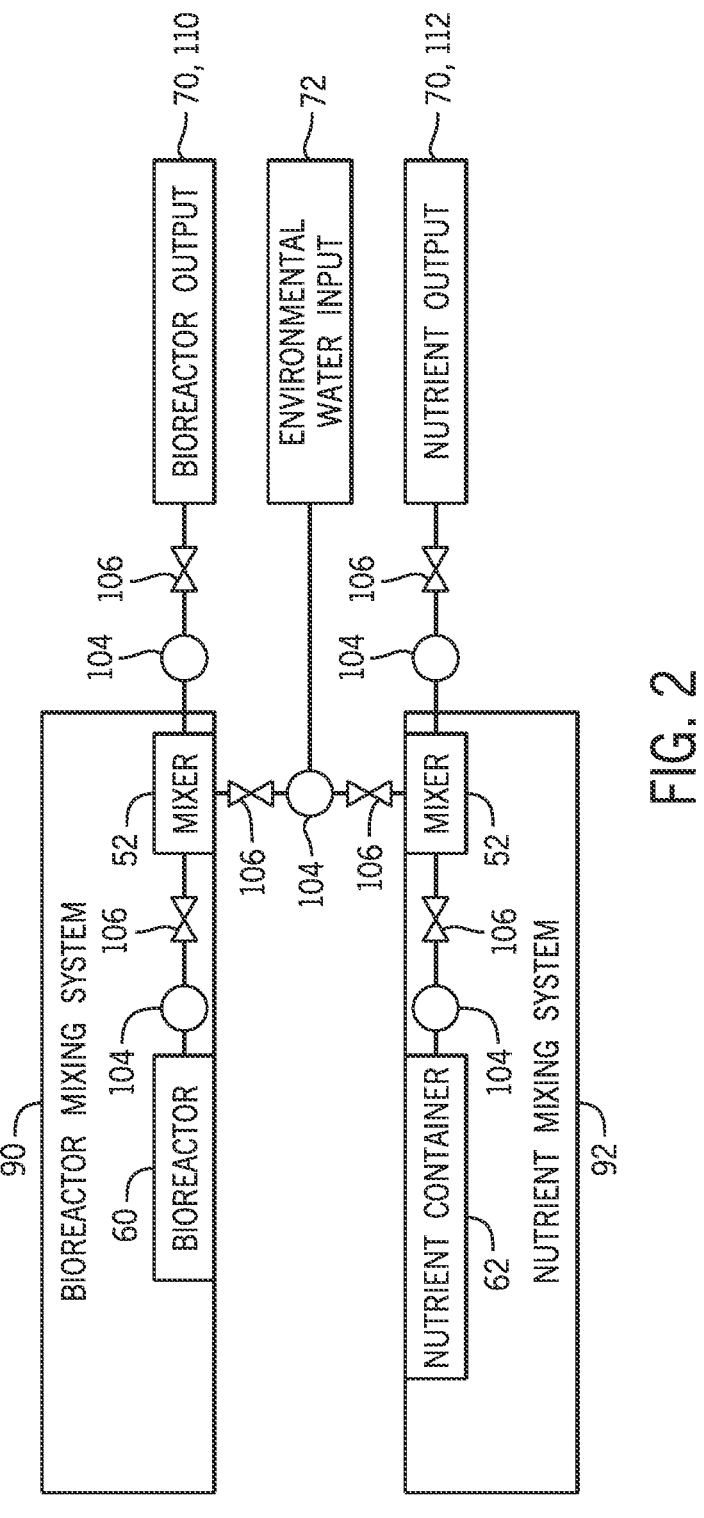
FIG. 2 is a schematic illustration of components of the environmental treatment distribution system, in accordance with embodiments the present disclosure.

FIG. 2 is a schematic illustration of an embodiment of an arrangement of components of the distribution system 50. In certain cases, the bioreactor 60 may be part of a bioreactor mixing system 90 that operates to dilute or process the contents of the bioreactor 60 prior to distribution. Similarly, the distribution system 50 may also include a nutrient mixing system 92 to dissolve, mix, or process the contents of the nutrient container 62 prior to distribution in some embodiments the bioreactor mixing system 90 and the nutrient mixing system are fluidically coupled to at least one environmental water input 72, which may be a shared input 72 or separate inputs 72. Environmental water can be transferred directly to the bioreactor 60 or to a separate mixer 100 that also receives contents of the bioreactor 60. Similarly, environmental water can be transferred directly to the nutrient container 62 or to a separate mixer 102 that also receives contents of the nutrient container 62. Processor-controlled pumps 104 and valves 106 can be activated to fluidically couple or uncouple components of the distribution system 50 as shown by way of example in FIG. 2. However, other arrangements are also contemplated, and additional or fewer pumps 104 and valves 106 may be incorporated. In the illustrated arrangement, one or more pumps 104 and valves 106 control entry of environmental water from the environmental water input 72 into the bioreactor mixing system 90 and the nutrient mixing system 92. After mixing, the mixed compositions, including microalgae or other organisms and/or mixed nutrients, can be distributed on or in the water via the at least one output 70, which may include a dedicated bioreactor output 110 and a dedicated nutrient output 112. It should be understood that each bioreactor 60 and nutrient container 62 may, in certain embodiments, be coupled to shared outputs 70 or separated, dedicated outputs, depending on the arrangement of the distribution system 50, the vessel, targeted location, and/or active weather patterns including but not limited to rainfall, currents and wave action.

The nutrient container 62, bioreactor 60, and/or the mixers 100, 102, may include one or more stirrers, spinners, paddles, blades, pumps, and/or other features positioned on or in the system 50 (e.g., at a bottom, top, or center of the nutrient container 62, bioreactor 60, and/or the mixers 100, 102) that facilitate mixing of nutrients or organisms to achieve desired characteristics of the distributed materials. For example, nutrients in nutrient containers may be provided as dry compositions, such as dry powers. If distributed directly into the water in powder form, the nutrients may not effectively disperse. Thus, mixing the nutrients with the environmental water (or other fluid) before distribution can enhance dispersal. In an embodiment, nutrients are mixed to achieve a mixed density that is close or approximately equal to that of the environmental water. Saltwater is denser (1.02-1.03 grams per cubic centimeter [g/cm3]) than fresh (1 gc/m3). Thus, nutrients distributed in saltwater or freshwater may be mixed to achieve a mixed solution density that is approximately (e.g., within 1-10 percent) that of a set or programmed density of salt water, sea water or ocean water, freshwater, brackish water, generally, or that of a measured density of the environmental water or the water at the location for distribution. It should be appreciated that the mixers 100, 102 may be designed to mix any of a variety of components together (e.g., the environmental water, freshwater, other fluid, nutrients, organisms, materials, media) to facilitate distribution, as described herein.

The controller 80 may control the activation of mixing features by turning on mixing features, e.g., by activating a paddle, activating a pump to create turbulence to enhance mixing, or by agitating or turning the mixers 100, 102, by way of example. The controller 80 may also select mixing settings depending on the contents of the mixers 100, 102. For example, nutrients may tolerate higher mixing intensity than organisms.

Figure 3:
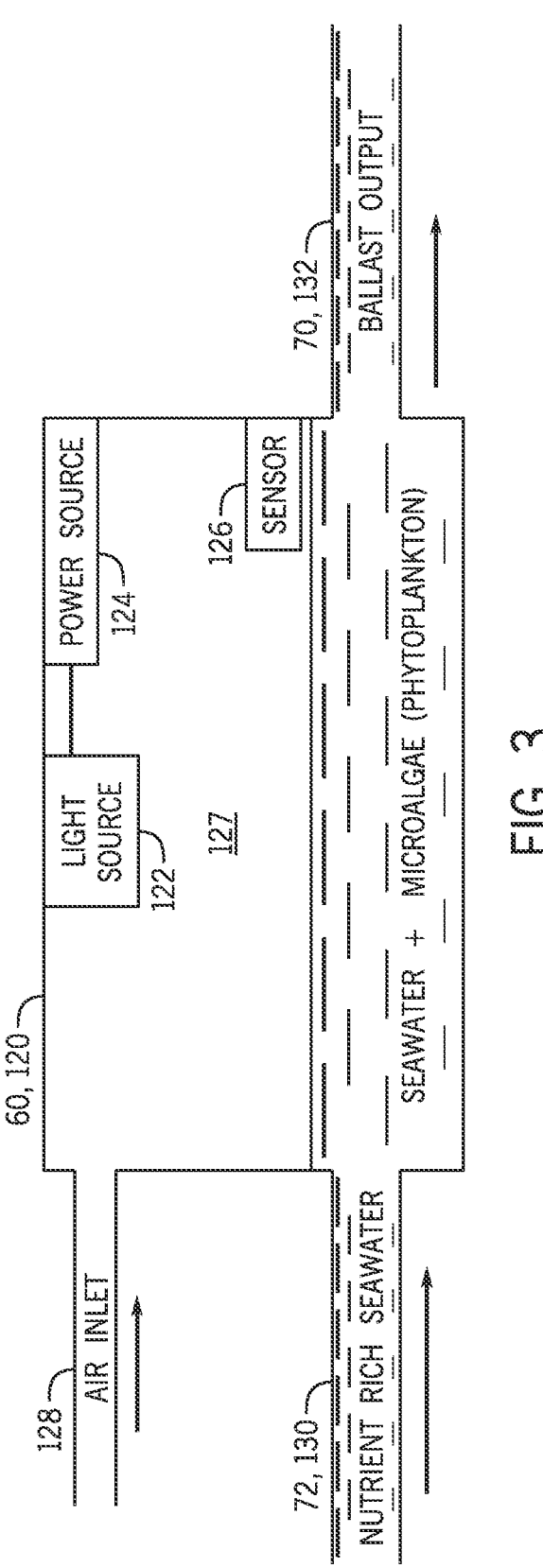
FIG. 3 is a schematic illustration of a ballast bioreactor that may be used in conjunction with the environmental treatment distribution system, in accordance with embodiments the present disclosure.

In certain cases, one or more components of the distribution system may be incorporated into pre-existing aquatic vessel structures or systems, such as the bilge system or other water or fluid transfer systems. FIG. 3 is a schematic diagram of an embodiment of a ballast tank bioreactor 120. Ballast tanks are used on certain aquatic vessels to hold water to provide stability. The ballast functions of a ballast tank can be achieved while also providing a bioreactor 60 for organism growth. The ballast tank bioreactor 120 includes a light source 122, such as a white light source or a white or visible light source, a power source 124, and a growth or condition sensor 126. Air is fed to an interior space 127 of the ballast tank bioreactor 120 via an air inlet 128. Nutrient rich sea water or other environmental water is provided as growth media via an input 72, which may be a dedicated ballast tank bioreactor inlet 130. Organisms such as microalgae or phytoplankton that have proliferated in the ballast tank bioreactor 120 can be transferred via an output 70, which may be a dedicated ballast output 132. The ballast output 132 may be directly into the environment or may be provided to a mixer 100, as shown in FIG. 2. Further, transfer of fluid into and out of the ballast tank bioreactor 120 may be under control of the controller 80 via activation and deactivation of one or more pumps 104 and opening or closing of one or more valves 106 (see FIG. 2).

Figure 4:
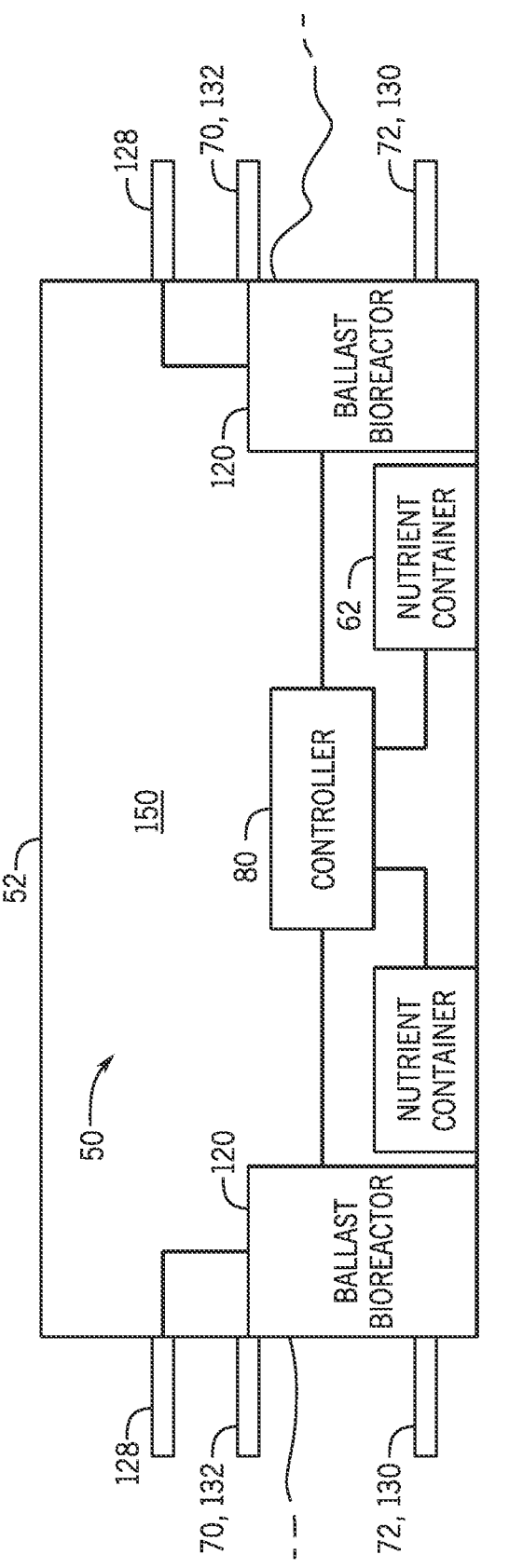
FIG. 4 is an environmental treatment distribution system implemented with ballast bioreactors on an aquatic vessel, in accordance with embodiments the present disclosure.
Figure 5:
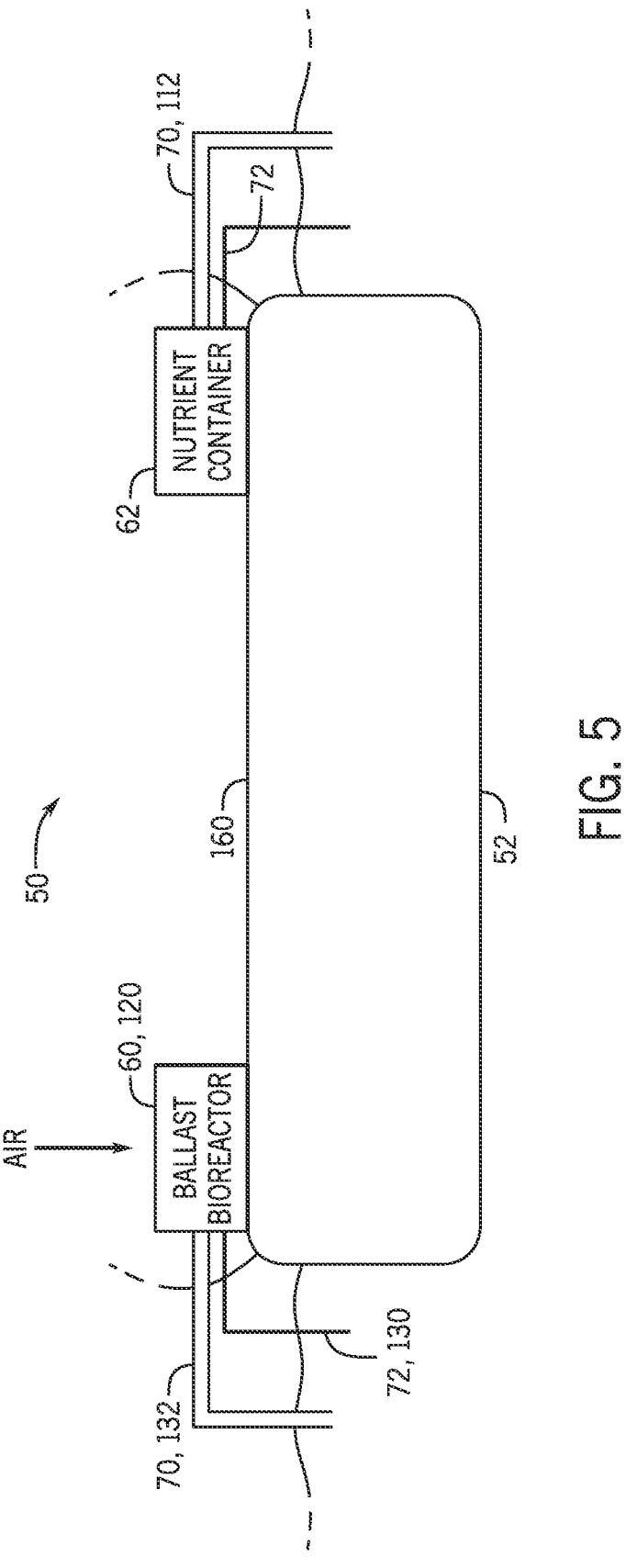
FIG. 5 is an environmental treatment distribution system implemented with ballast bioreactors on a near-shore aquatic vessel, in accordance with embodiments the present disclosure.

FIG. 4 is a schematic illustration of an embodiment of an aquatic vessel 52 including the distribution system 50 that incorporates bioreactors 60, such as ballast tank bioreactors 120, together with nutrient containers 62. It should be understood that the distribution system 50 as provided herein may be a nutrient-only, bioreactor-only, or combined system as in the illustrated embodiment. Further, the distribution system 50 may include mixing components as shown in FIG. 2. The controller 80 can be programmed to identify or receive inputs as to the arrangement of components. As illustrated, the ballast bioreactor 120 may be arranged such that the air inlet 128 is positioned above the water line while the at least one environmental water input 72, or dedicated ballast input 130 and/or nutrient container input (not shown), is below the water line. The at least one output 70, such as the ballast output 132 and/or the nutrient output 112 (not shown) can be positioned to be at or near (e.g., above and/or below) an estimated water line location on the vessel 52. For larger aquatic vessels, one or more components of the distribution system 50 may be located in an interior space 150. Smaller or near-shore vessels, as illustrated in FIG. 5, may be arranged with bioreactors 60, such as ballast bioreactors 120, and nutrient containers 62 arranged on a vessel deck 160. The at least one output 70, such as the ballast output 132 or the nutrient output 112 are similarly arranged to be at or near (e.g., above and/or below) a water line of the vessel 52 while the at least one environmental water input 72 or dedicated ballast input 130 and/or any nutrient container input is below the water line.

In an embodiment, the bioreactor 60 may be implemented as a multifunctional marine container that vessel operators may use to hold marine catch. However, when not being used to store marine catch, these marine containers may alternatively be used for organism growth. Thus, a marine container may be implemented to include bioreactor features such as an inlet for environmental water, an air source, nutrient source, and light source (e.g., a housing that permits white light through transmittal or a separate light source).

Additionally or alternatively, the disclosed techniques may be used to distribute organisms grown off-vessel (e.g., grown using bioreactors 60 housed on land or housed on dedicated organism growing vessels), but distributed by the disclosed vessels 52. For example, for certain nearshore marine settings, smaller vessels (such as shrimp boats) may not be configured or have sufficient hold or deck space to incorporate bioreactors 60. These vessels 52 may include one or more nutrient containers 62 (which may be part of a mixing system 92, as shown in FIG. 2). If these vessels 52 are also used to distribute organisms (e.g., microalgae/phytoplankton), organism cultivation may be off-vessel, such as at a separate facility. In one example, the organisms may be grown in a nearby onshore facility and then the vessel 52 would transport the organisms to the desired location. In other vessels, the bioreactors 60 may be on-board, but instead or in addition to being configured as ballast tanks, the bioreactors 60 may be marine holding tanks that can be for shrimp, crabs, or specific marine organisms.

Additionally or alternatively, the distribution system 50 may be used in conjunction with fixed structures, such as floating docks, ocean platforms, well-heads, pipelines, fixed cables, etc. In certain embodiments, the system 50 may be implemented as a fixed or floating system not associated with any vessel 52. The fixed or floating system 50 may be serviced by vessels that refill nutrients containers 62 (e.g., based on sensor readings of nutrient levels). The system 50 may communicate with a central system, e.g., to transmit location information, identification information, status updates, and/or to permit service and maintenance. Such systems 50 may use solar, wind, or battery power as a power source to power distribution operations. When present, the bioreactor 60 may be implemented as a translucent tank to permit ambient light entry and/or may include a separate light source.

As provided herein, the bioreactor 60 may be seeded with a culture of a desired organism. The seeded organism should be sufficient concentration for desired exponential growth, e.g., during transport or during an operation cycle of the system 50. The seeded organism is permitted to proliferate to a bloom, which can be sensed using sensors 82 associated with (e.g., positioned in) the bioreactor 60. Once a bloom or sufficient exponential growth is achieved, the organism can be distributed. However, in an embodiment, enough organisms can be maintained in the bioreactor 60, even after distribution, to initiate a next cycle of growth to bloom and, in embodiments, to outcompete organisms present in the environmental water supply. In an embodiment, the environmental water is taken in to feed the next cycle of growth. Thus, the controller 80 can stop distribution before the bioreactor 60 is empty to maintain a seed for a subsequent growth cycle in an embodiment. In embodiments, each bioreactor 60 can facilitate multiple growth and distribution cycles while in operation and/or during vessel operation over a particular route. Starting with sufficient seed concentration at initial and/or subsequent cycles permits the desired organism to exponentially outgrow any organisms in the environmental water input.

The system 50 may, in certain embodiments, include a supply set of bioreactors 60 that are dedicated to growth of a particular organism or organisms. The supply set may be land-based or housed in a supply vessel that services vessels 52.

Figure 6:
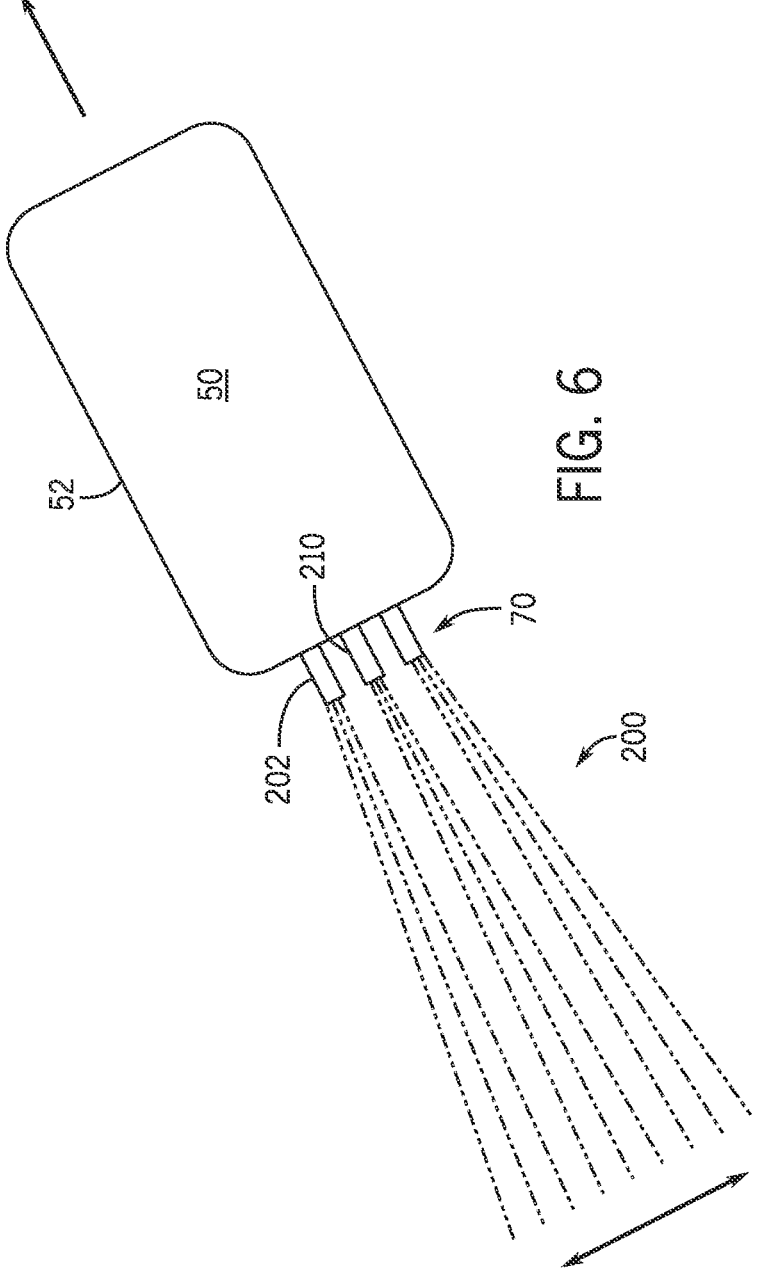
FIG. 6 shows a dispersal pattern of materials distributed from an environmental treatment distribution system of an aquatic vessel, in accordance with embodiments the present disclosure.

FIG. 6 shows an example dispersal pattern of distributed materials 200 that may include nutrients and/or organisms, e.g., microalgae. Using the distribution system 50 incorporated as part of the aquatic vessel 52, materials are distributed via at least one output 70 of the distribution system 50 such that the distributed materials are generally distributed onto or near a water surface. In certain embodiments, the desired distribution may be at a depth deeper than the surface of the water.

In an embodiment, the at least one output 70 may include output conduits 202 and dispersal enhancement conduits 210. For example, simultaneous airflow (e.g., generated via a fan) together with material output may enhance dispersal. The dispersal enhancement conduit 210 may be at water level or below water level to create areas of local turbulence to enhance dispersal.

Dispersal techniques represent the movement, spread and/or transport of plankton nutrients, media, and/or other materials introduced into aquatic environments (e.g., coastal marine, nearshore marine, open ocean, deep ocean and/or lakes, ponds, rivers, streams, bays, wetlands and estuaries) following dispersal vectors such as abiotic vectors (e.g., ocean currents, wind, waves). Dispersal patterns of plankton, nutrients, media, and/or materials and/or media are determined by the dispersal mechanism (gravity, wind, ballistic, water, and by animals), which in turn impacts genetic and/or demographic structure of plankton communities including but not limited to species interactions and migration patterns.

In an embodiment, dispersal patterns may utilize ocean current dynamics and/or movement, as defined by variations in water density. This embodiment can also utilize the selection of locations based on the detected presence of underlying water masses and location within a major and/or minor oceanographic basin in order for the desired effect (or effects) that may include, but are not limited to, decreased aquatic hypoxia, increased aquatic oxygenation, or increased export of materials to depth, enhance fisheries. The desired end goals may be used to control selection of the distributed materials from the distribution system 50. In an embodiment, dispersal patterns via wind incorporate local and/or global wind patterns. Locations for distribution may be chosen based on preferred wind patterns, currents, and/or upwelling and/or downwelling conditions, enabling introduced nutrients and/or plankton to move into the region and/or regions or areas that provide the desired effect (or effects) that may include but are not limited to decreased aquatic hypoxia, increased aquatic oxygenation, and increased export of materials to depth, enhance fisheries. In an embodiment, dispersal patterns of nutrients and/or plankton via a ballistic approach involves the release of plankton and/or nutrients in areas and/or regions in which the water column is stratified and/or movement of water is negligible, indicating an external force is determined to enhance distribution of the desired particles and/or plankton that provide the desired effect (or effects). In an embodiment, dispersal patterns of nutrients and/or plankton via water movement or animal activity result in transportation of the nutrients and/or plankton to the desired location so that the desired effect (or effects) are achieved. For example, animal activity may be associated with migration and/or the consumption and release from fecal matter. The presence of desired plankton and/or nutrients at one location may change as a result of animal activity.

Figure 7:
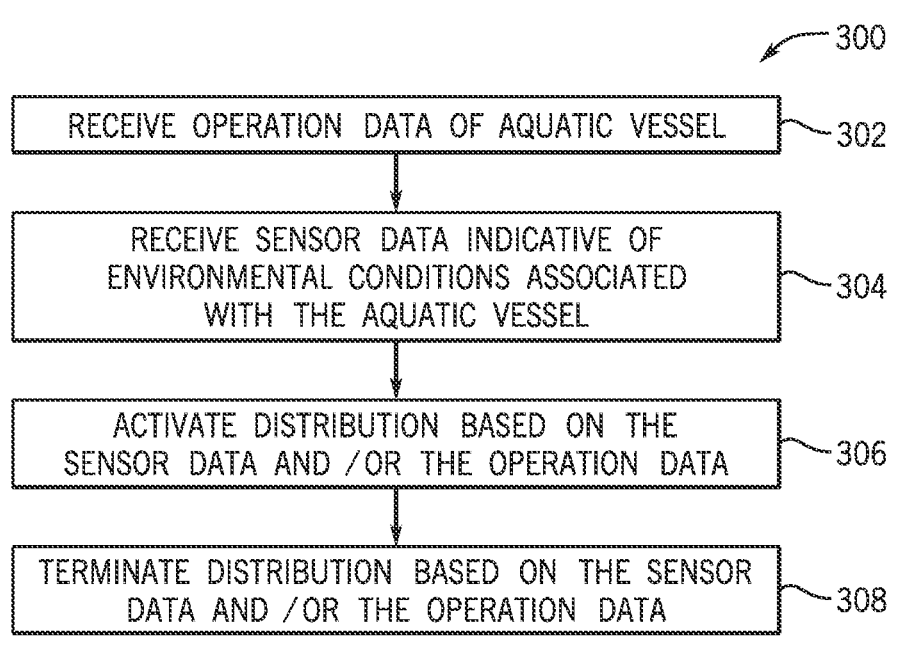
FIG. 7 is a flow diagram of a method of environmental treatment distribution, in accordance with embodiments the present disclosure.

FIG. 7 is a flow diagram of an embodiment of a method 300 of environmental treatment distribution and with reference to features of FIGS. 1-6. The method 300 may be performed at least in part by the distribution system 50. The distribution system 50 receives operation data of an aquatic vessel (block 302) and sensor data indicative of environmental conditions associated with the aquatic vessel (block 304). For example, the sensor data may be from on-board sensors 82 and/or may be received from a weather service, e.g., from satellites, buoys, or airborne sensors. The environmental conditions associated with the aquatic vessel 52 may represent local data for the geographic location (e.g. a global positioning system [GPS] location or maritime coordinates per the operation data) of the aquatic vessel 52, e.g., at a same location, within a range of the location, such as within 500 m of the location, within 1 km-5 km of the location, or within 50 km of the location.

The distribution system 50 is activated to distribute materials, such as nutrients and/or organisms, based on the sensor data and/or the operation data (block 306). In an embodiment, the distribution is based on local physical, chemical, and/or biological oceanographic conditions, as defined by a wide range of oceanographic data including but not limited to water composition (presence of cations and anions), surface and deepwater currents, turbidity conditions, which mix of nutrients and/or plankton selected for the local area, presence and/or intensity of upwelling and/or downwelling, varieties of lifeforms present, isotopic systematics of any element present in water in aquatic environments (e.g., coastal marine, nearshore marine, open ocean, deep ocean and/or lakes, ponds, rivers, streams, bays, wetlands and estuaries), surface primary productivity levels (e.g, chlorophyll), presence/absence of known grazing, gas exchange rates with the atmosphere, presence/absence of zooplankton, aggregate and/or fecal pellet formation potential. The composition of the elemental breakdown of the materials and/or nutrients used to induce an effect or effects, including but not limited to plankton growth and/or proliferation and/or removal, may be determined by the presence and/or absence of a wide range of cations, anions, and elemental breakdown of the local seawater which includes the compositional and/or isotopic breakdown of each compound, cation, and/or anion present in the water.

One embodiment includes automatic shutoff or control systems for deactivation of distribution (block 308). In an embodiment, termination of distribution is based on operator control and/or based on the sensor data/and or the operation data. For example, the sensor data may be updated sensor data taken at a subsequent time point or updated operation data indicative of vessel movement out of a geographic location of interest. Other examples include automated processing of data (signals such as wave data, oceanographic data, water sampling data, environmental data, or other data that indicate dispersion should be stopped. In an embodiment, the environmental treatment distribution system may include control algorithms that increase, decrease, stop, and/or start dispersion operations based on environmental feedback and/or operation data of the aquatic vessel 52.

Figure 8:
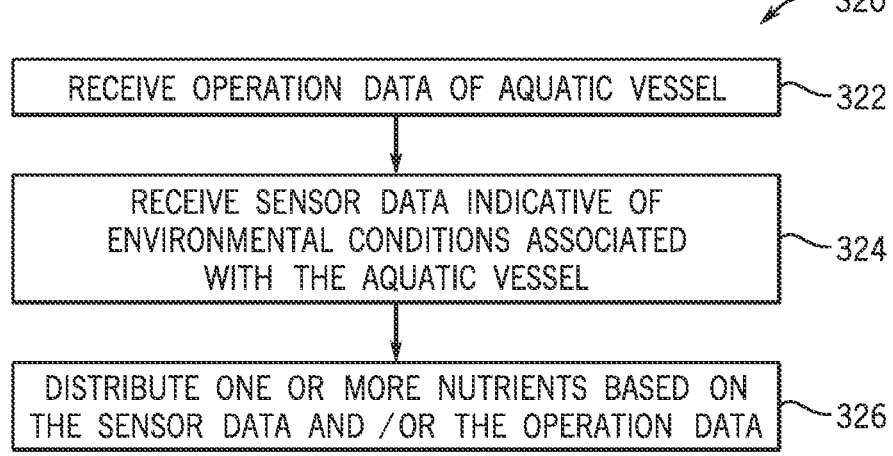
FIG. 8 is a flow diagram of a method of environmental treatment distribution, in accordance with embodiments the present disclosure.

FIG. 8 is a flow diagram of an embodiment of a method 320 of environmental treatment distribution and with reference to features of FIGS. 1-6. The method 320 may be performed at least in part by the distribution system 50. The distribution system 50 receives operation data of an aquatic vessel (block 322) and sensor data indicative of environmental conditions associated with the aquatic vessel (block 324). For example, the sensor data may be from on-board sensors 82 and/or may be received from a weather service, e.g., from satellites, buoys, or airborne sensors. The environmental conditions associated with the aquatic vessel 52 may represent local data for the geographic location (e.g. a GPS location or maritime coordinates per the operation data) of the aquatic vessel 52, e.g., at a same location, within a range of the location, such as within 500 m of the location, within 1 km-5 km of the location, or within 50 km of the location. The distribution system 50 is activated to distribute one or more nutrients based on the sensor data and/or the operation data (block 326).

Figure 9:
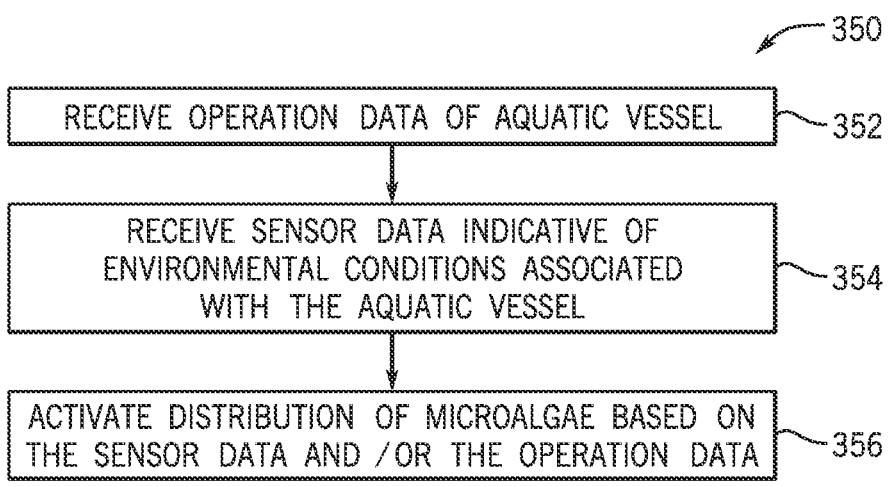
FIG. 9 is a flow diagram of a method of environmental treatment distribution, in accordance with embodiments the present disclosure.

FIG. 9 is a flow diagram of an embodiment of a method 350 of environmental treatment distribution and with reference to features of FIGS. 1-6. The method 350 may be performed at least in part by the distribution system 50. The distribution system 50 receives operation data of an aquatic vessel (block 352) and sensor data indicative of environmental conditions associated with the aquatic vessel (block 354). For example, the sensor data may be from on-board sensors 82 and/or may be received from a weather service, e.g., from satellites, buoys, or airborne sensors. The environmental conditions associated with the aquatic vessel 52 may represent local data for the geographic location (e.g. a GPS location or maritime coordinates per the operation data) of the aquatic vessel 52, e.g., at a same location, within 500 m of the location, within 1 km-5 km of the location, or within 50 km of the location. The distribution system 50 is activated to distribute organisms, such as microalgae, based on the sensor data and/or the operation data (block 356).

Figure 10:
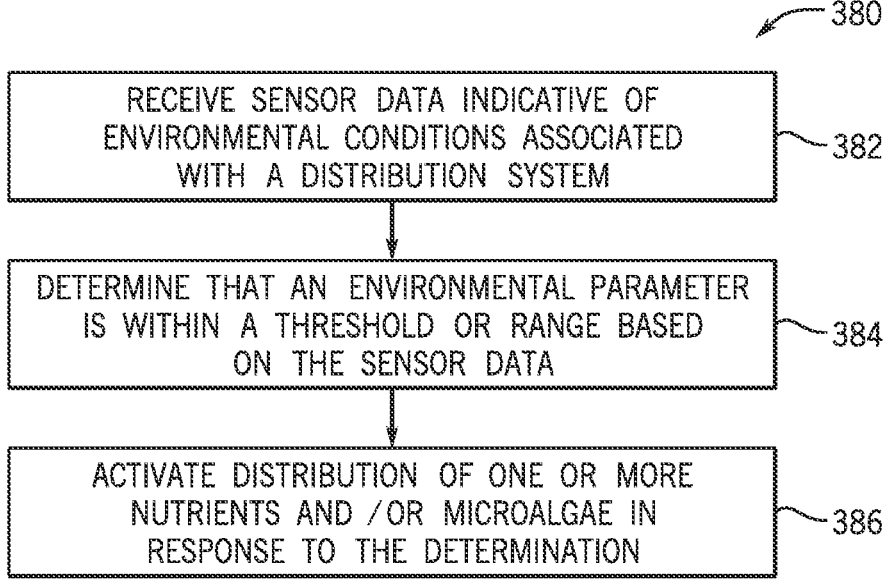
FIG. 10 is a flow diagram of a method of environmental treatment distribution, in accordance with embodiments the present disclosure.

FIG. 10 is a flow diagram of an embodiment of a method 380 of environmental treatment distribution and with reference to features of FIGS. 1-6. The method 380 may be performed at least in part by the distribution system 50. The distribution system 50 receives sensor data indicative of environmental conditions associated with the aquatic vessel (block 382). For example, the sensor data may be from on-board sensors 82 and/or may be received from a weather service, e.g., from satellites, buoys, or airborne sensors. The environmental conditions associated with the aquatic vessel 52 may represent local data for the geographic location (e.g. a GPS location or maritime coordinates per the operation data) of the aquatic vessel 52, e.g., at a same location, within a range of the location, such as within 500 m of the location, within 1 km-5 km of the location, or within 50 km of the location.

Based on the sensor data, the distribution system 50 determinates that an environmental parameter is within a threshold or range (block 384). The distribution system 50 is activated to distribute one or more nutrients and/or organisms, such as microalgae, in response to the determination. (block 386). Based on updated sensor data, such as sensor data that deviates from the threshold or range, the distribution system 50 may be deactivated.

In one example, the environmental parameter is wind speed, and the threshold wind speed is set to 20 knots, and any wind speed above 20 knots is determined to be a condition for deactivation of the distribution system 50 while wind speeds below 20 knots are considered favorable for distribution. Thus, the distribution system 50 may be dynamic, automatically activating during favorable conditions and automatically deactivating when the conditions are no longer favorable. Further, the distribution system 50 may adjust operation based on the environmental parameter(s) and/or to compensate for the environmental parameter(s), such as by changing a fan speed of the fan to increase the airflow through the dispersal enhancement conduit 210 (e.g., increasing the fan speed in response to the wind speed below the threshold wind speed; the fan speed varies based on the wind speed), adjusting a density of the mixed solution for dispersal, adjusting a position of the at least one outlets 70 relative to the vessel 52 and/or the water line, employing ballistics to inject the materials below the water line, and so forth.

In certain embodiments, the system 50 may determine that environmental conditions are acceptable before activating distribution. For example, the system 50 may require that at least two of the following conditions are true to activate distribution: wind speed below 20 knots, wave height of less than 1.5 meters, surface current of less than 2 knots. Additionally or alternatively, the system 50 may activate distribution based on a time of day to disperse during the day or right at sunrise or just before sunrise to maximize growth and available light. In an embodiment, the system 50 may distribute based on sensor readings of sufficient ambient light and lack of cloud cover.

Steps of the method 300 (FIG. 7), the method 320 (FIG. 8), the method 350 (FIG. 9), and the method 380 (FIG. 10) may be performed separately or combined to distribute nutrients and/or organisms. As noted herein, steps of the method 300 (FIG. 7), the method 320 (FIG. 8), the method 350 (FIG. 9), and the method 380 (FIG. 10) may be performed by the distribution system 50, such as by the controller 80, but it should be noted that any suitable processor-based device may be specially programmed to perform any of the methods described herein. Moreover, although the method 300 (FIG. 7), the method 320 (FIG. 8), the method 350 (FIG. 9), and the method 380 (FIG. 10) are described as including certain steps performed in a particular order, it should be understood that the steps of the method 300 (FIG. 7), the method 320 (FIG. 8), the method 350 (FIG. 9), and the method 380 (FIG. 10) may be performed in any suitable order, that certain steps may be omitted, and/or that certain steps may be added.

Figure 11:
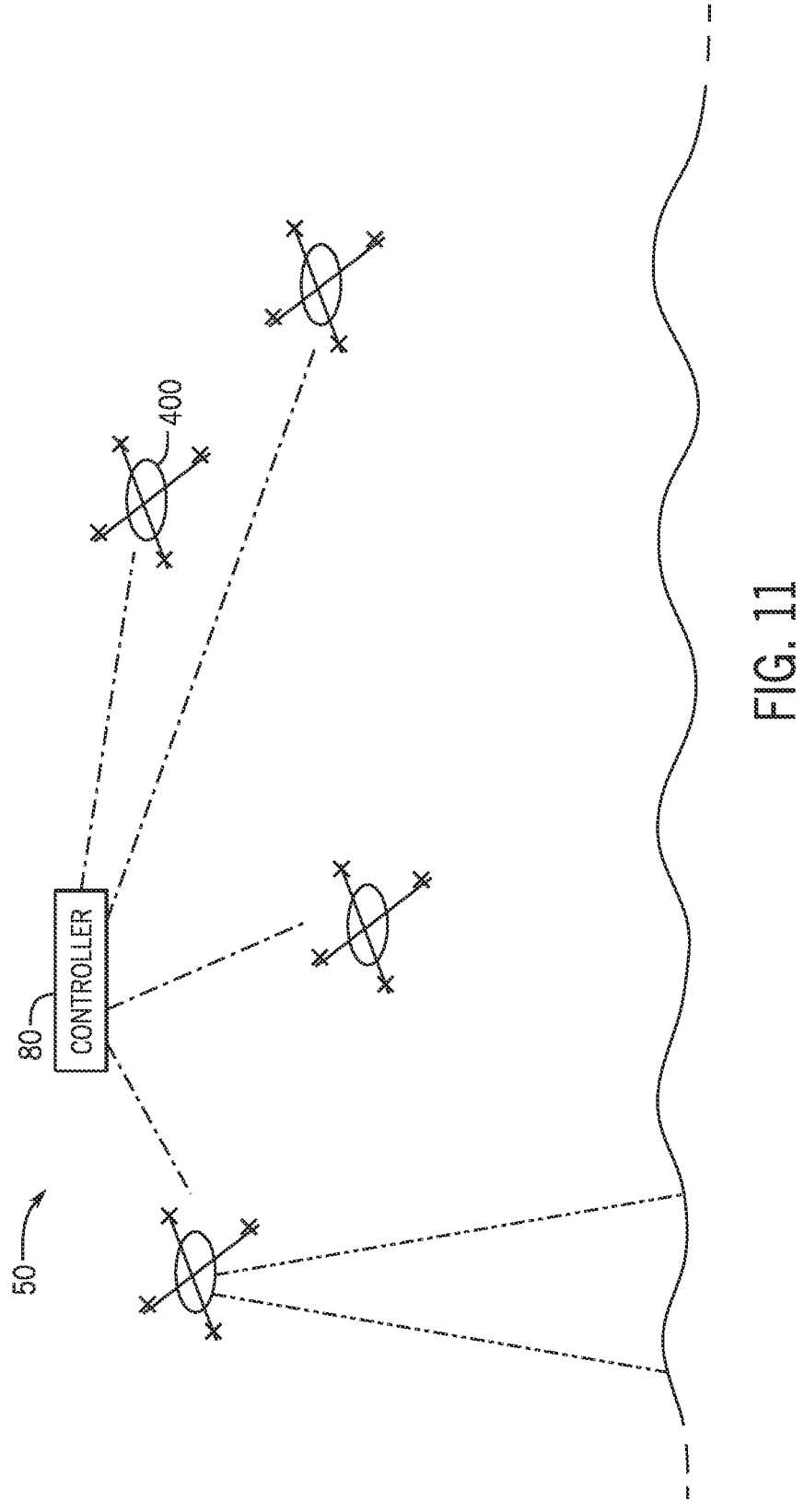
FIG. 11 is a schematic illustration of an environmental treatment distribution system used in conjunction with unmanned aerial vehicles, in accordance with embodiments the present disclosure.

FIG. 11 is a schematic illustration of an embodiment of the distribution system 50 implemented in conjunction with an aerial vehicle, such as an unmanned aerial vehicle 400 (e.g., a drone). A fleet of unmanned aerial vehicles, each in communication with the controller 80, may be used to distribute materials. Other contemplated aerial vehicles include passenger planes, cargo planes, and helicopters. It should be appreciated that the vessel 52, a fleet of aquatic vessels, the unmanned aerial vehicle 400, the fleet of unmanned aerial vehicles, the other aerial vehicles, or any combination thereof may be utilized as part of the distribution system 50. For example, the controller 80 may coordinate operation of the multiple vehicles (e.g., aquatic vessels, umanned aerial vehicles, other aerial vehicles) and distribution of the materials from the multiple vehicles. Further, the vehicles may be autonomously controlled vehicles (e.g., according to preprogrammed paths), remotely controlled vehicles (e.g., via a remotely-located controller operated by a human operator), and/or operator controlled vehicles (e.g., driven by a human operator on-board the vehicle). In this way, the distribution system 50 may be a network of vehicles that are controlled in a coordinated manner to effectively and/or efficiently distribute the materials. In some cases, the unmanned aerial vehicle 400 or the other aerial vehicles may have any of the components shown and described as being present on the vessel 52, such as the one or more bioreactors 60, the one or more nutrient containers 62, the mixers 100, 102, and so forth. Additionally or alternatively, the unmanned aerial vehicle 400 and/or the other aerial vehicles may collect the materials from the vessel 52 (e.g., grown, stored, and/or mixed on the vessel 52), store the materials on-board via a storage tank, and then travel and distribute the materials according to instructions received from the controller 80, for example.

Figure 12:
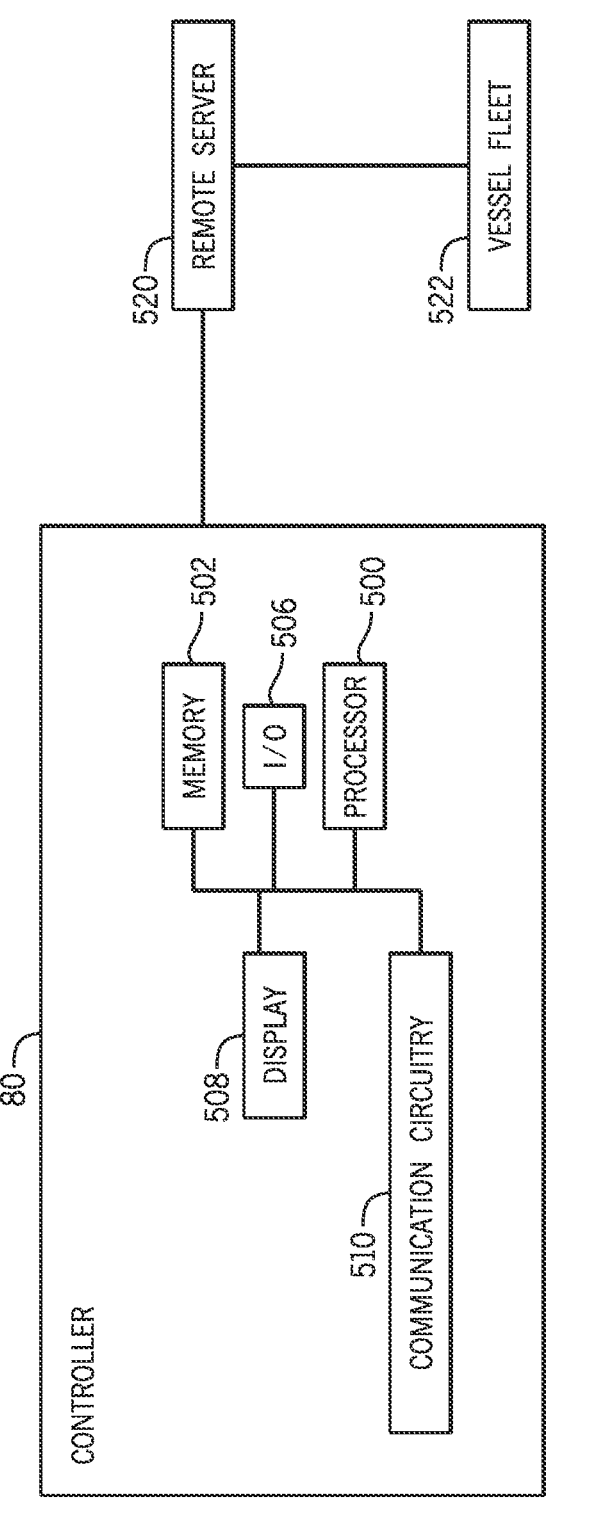
FIG. 12 is a block diagram of a controller of an environmental treatment distribution system and associated components.

FIG. 12 is a block diagram of the controller 80 of the distribution system 50 and associated communication pathways. As will be appreciated, in certain embodiments, the controller 80 may include at least one processor 500, memory 502, or any of a variety of other components, such as input/output interface 506, and a display 508 that enable the controller 80 to carry out the techniques described herein. In addition, in certain embodiments, the controller 80 may include communication circuitry 510 to facilitate communication with other control systems of the vessel 52, with a remote server 520, or with other members of the vessel fleet 522. In certain embodiments, the communication circuitry 510 may be configured to facilitate wireless communication and/or wired communication.

The processor 500 may be any suitable type of computer processor or microprocessor capable of executing computer-executable code. In certain embodiments, the processor 500 may also include multiple processors that may perform the operations described herein, and certain operations may be distributed between the processor 500 and one or more remote servers 520. The memory 502 may be any suitable articles of manufacture that can serve as media to store processor-executable code, data, or the like. These articles of manufacture may represent computer-readable media (e.g., any suitable form of memory or storage) that may store the processor-executable code used by the processor 500 to perform the presently disclosed techniques. The memory 502 may also be used to store data, various other software applications, and the like. The memory 502 may represent non-transitory computer-readable media (e.g., any suitable form of memory or storage) that may store the processor-executable code used by the processor 500 to perform various techniques described herein.

In one example, the controller 80 may control or generate instructions to control a route of the aquatic vessel 52 and/or other distribution vehicle (e.g., airplane, unmanned aerial vehicle). For example, based on sensor data of current or wind speeds, the controller 80 may steer the vessel 52 to maximize a spread of distribution on or in the water. In a specific embodiment, the controller 80 may generate instructions to steer the vessel 52 towards lower wind locations relative to locations with higher wind speed. Further, the controller 80 may be capable of altering or modifying a preplanned travel route of the vessel 52 to promote more efficient distribution of materials while the distribution system 50 is actively distributing materials and/or to control movement of the vessel 52 to desired distribution locations.

In one embodiment, the controller 80 may use estimated fuel expenditures as an input to route or distribution planning. For example, modifications to shipping routes for improved distribution may be permitted so long as (e.g., only if) vessel fuel expenditures associated with the change are estimated to increase no more than a certain percentage, such as 1 percent, relative to the unmodified route by way of example.

The controller 80 may use machine learning and/or artificial intelligence and/or deep learning to model aquatic conditions and/or generate control algorithms for distribution of materials.

The disclosed environmental treatment distribution system may be used to promote desired environmental treatment effects, such as decreased aquatic hypoxia, increased aquatic oxygenation, increased export of materials to depth, enhance fisheries. The desired effects may be created as part of distribution to surface waters of aquatic environments from maritime operating vessels and/or aircraft such as planes and/or helicopters in conjunction with other materials and/or nutrients enhancing growth and survivability.

In an embodiment, activity is conducted to change the physical and/or chemical composition of the aquatic system and/or environment and/or place such as but not limited to carbonate ion content, pH, temperature, salinity, oxygen content, macronutrient concentrations and/or content, micronutrient concentrations and/or content, cation and/or anion concentrations and/or content, dissolved organic compounds, clay contents and/or concentrations, isotopic systematics including that of hydrogen, carbon, oxygen, nitrogen, sulfur, lithium, boron, strontium, calcium, magnesium, lead, or any other element and/or atom and/or molecule or combinations thereof.

In an embodiment, activity is conducted to induce a change in the physical and/or chemical composition of the aquatic system and/or environment and/or place such as but not limited to carbonate ion content, pH, temperature, salinity, oxygen content, macronutrient concentrations and/or content, micronutrient concentrations and/or content, cation and/or anion concentrations and/or content, dissolved organic compounds, clay contents and/or concentrations, isotopic systematics including that of hydrogen, carbon, oxygen, nitrogen, sulfur, lithium, boron, strontium, calcium, magnesium, lead, or any other element and/or atom and/or molecule or combinations thereof.

In an embodiment, activity is conducted to change the absolute or relative position and/or mixture of a body of water and/or current near the surface and/or at depth. In an embodiment, activity is conducted to induce a change to the absolute or relative position and/or mixture of a body of water and/or current near the surface and/or at depth.

In an embodiment, plankton and/or other organisms by themselves or in combination with other materials such as but not limited to nutrients such as but not limited to iron, phosphorous, nitrogen, silica, aluminum, manganese, calcium, sodium, potassium, and/or magnesium are introduced into aquatic places or environment by means of a mechanism that allows for spreading and/or dispersion of the biologic and/or non-biologic materials being introduced into singular or plural aquatic places or environments with an intent to enhance and/or induce certain desired effects such as but not limited to growth of certain biologics or derivatives of biologics or limitations of growth of certain biologics or derivatives of biologics or sinking of certain biologics or derivatives of biologics.

In an embodiment, plankton and/or other organisms by themselves or in combination with other materials such as but not limited to nutrients such as but not limited to iron, phosphorous, nitrogen, silica, aluminum, manganese, calcium, sodium, potassium, and/or magnesium are introduced into aquatic places or environments by means of a mechanism that allows for focus and/or concentration of the biologic and/or non-biologic materials being introduced into singular or plural aquatic places or environments with an intent to enhance and/or induce certain desired effects.

In an embodiment, plankton and/or other organisms by themselves or in combination with other materials such as but not limited to nutrients such as but not limited to iron, phosphorous, nitrogen, silica, aluminum, manganese, calcium, sodium, potassium, and/or magnesium are released in different concentrations either relative to each other or relative to another material such as water.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An environmental treatment distribution system, comprising:
a plurality of nutrient containers;
a nutrient mixer configured to receive one or more nutrients from one or more nutrient containers of the plurality of nutrient containers;
one or more environmental sensors configured to generate environmental condition data indicative of environmental conditions at a location; and
a controller configured to:
receive the environmental condition data;
generate instructions to dilute and mix at least one nutrient of the one or more nutrients within the nutrient mixer to form a nutrient solution that comprises a respective density that corresponds to a respective density of environmental water within an aquatic environment at or near the location; and
generate instructions to distribute the nutrient solution into the aquatic environment at or near the location based on the environmental condition data.

2. The environmental treatment distribution system of claim 1, comprising:
a plurality of bioreactors; and
a separate mixer configured to receive contents from one or more bioreactors of the plurality of bioreactors, wherein the contents comprise organisms;
wherein the controller is configured to:
generate instructions to dilute and mix the contents within the separate mixer to form diluted contents; and
generate instructions to distribute the diluted contents into the aquatic environment at or near the location based on the environmental condition data.

3. The environmental treatment distribution system of claim 2, wherein the controller is configured to:
receive bioreactor data from a bioreactor sensor; and
select the one or more bioreactors based on the bioreactor data.

4. The environmental treatment distribution system of claim 1, wherein the environmental condition data is indicative of a pH, a dissolved oxygen, sedimentation, and chlorophyll within the aquatic environment at the location.

5. The environmental treatment distribution system of claim 1, wherein the controller is configured to:
generate the instructions to distribute the nutrient solution into the aquatic environment at or near a surface of the aquatic environment.

6. The environmental treatment distribution system of claim 1, wherein the environmental treatment distribution system is disposed on or in an aquatic vessel or an aerial vessel.

7. The environmental treatment distribution system of claim 1, wherein the nutrient solution comprises a synthetic volcanic ash in solution, wherein the synthetic volcanic ash comprises a plurality of nutrients that synthetically imitate volcanic ash.

8. The environmental treatment distribution system of claim 2, wherein the nutrient solution comprises silica, and the diluted contents comprise diatoms.

9. The environmental treatment distribution system of claim 1, wherein the one or more environmental sensors comprise a density sensor configured to generate the environmental condition data indicative of the respective density at the location.

10. The environmental treatment distribution system of claim 1, wherein the respective density of the nutrient solution corresponds to the respective density of the environmental water within the aquatic environment at or near the location when the respective density of the nutrient solution is within 10 percent of the respective density of the environmental water within the aquatic environment at or near the location.

11. The environmental treatment distribution system of claim 1, wherein the at least one nutrient comprises a dry powder, a liquid solution, or both, and the controller is configured to generate instructions to dispense the dry powder, the liquid solution, or both from the one or more nutrient containers to the nutrient mixer.

12. An environmental treatment distribution system, comprising:
a bioreactor comprising:
an air inlet configured to receive air;
an environmental water inlet configured to receive environmental water;
a light source configured to emit light; and
an outlet configured to dispense contents comprising organisms;
a mixer configured to receive the contents and to mix the contents with additional environmental water to form diluted contents;
one or more environmental sensors configured to generate environmental condition data indicative of environmental conditions at a location;
a controller configured to:
receive the environmental condition data;
generate instructions to mix the contents with the additional environmental water to form the diluted contents with a respective density that corresponds to a respective density of an aquatic environment at or near the location; and
generate instructions to distribute the diluted contents into the aquatic environment at or near the location based on the environmental condition data.

13. The environmental treatment distribution system of claim 12, comprising an aquatic vessel with a ballast tank configured to provide stability to the aquatic vessel or a multifunctional marine holding tank configured to hold marine catch, wherein the ballast tank or the multifunctional marine holding tank is configured with the air inlet, the environmental water inlet, the light source, and the outlet to operate as the bioreactor to facilitate organism growth on the aquatic vessel.

14. The environmental treatment distribution system of claim 12, wherein the controller is configured to generate the instructions to distribute the diluted contents from the outlet into the aquatic environment at or near the location based on the environmental condition data and based on a time of day.

15. An environmental treatment distribution method, comprising:

storing one or more nutrients in one or more nutrient containers on an aquatic vessel;

storing organisms in one or more bioreactors on the aquatic vessel;

receiving operation data of the aquatic vessel;

receiving sensor data indicative of environmental conditions associated with an aquatic environment;

diluting and mixing at least one nutrient of the one or more nutrients in a nutrient mixer to form a nutrient solution with a respective density that corresponds to a respective density of environmental water within the aquatic environment;

diluting and mixing respective organisms from at least one bioreactor of the one or more bioreactors in a separate mixer to form diluted contents that comprise the respective organisms;

activating distribution of the nutrient solution, the diluted contents, or both, from the aquatic vessel to the aquatic environment based on the sensor data, the operation data, or both; and terminating distribution of the nutrient solution, the diluted contents, or both, from the aquatic vessel to the aquatic environment based on the sensor data, the operation data, or both.

16. The method of claim 15, wherein the activating the distribution comprises distributing the nutrient solution and the diluted contents simultaneously.

17. The method of claim 15, wherein the receiving the sensor data indicative of the environmental conditions comprises receiving the sensor data indicative of a wind speed and a wave height, and the activating the distribution comprises activating the distribution of the diluted contents responsive to the sensor data indicating that the wind speed and the wave height are below respective thresholds.

18. The method of claim 15, comprising:

mixing a portion of the environmental water extracted from the aquatic environment with the at least one nutrient of the one or more nutrients in the nutrient mixer to form the nutrient solution; and mixing another portion of the environmental water extracted from the aquatic environment with the respective organisms from the at least one bioreactor of the one or more bioreactors in the separate mixer to form the diluted contents.

19. The method of claim 15, wherein the activating the distribution comprises distributing the nutrient solution from the aquatic vessel to the aquatic environment via a first dedicated output and the diluted contents from the aquatic vessel to the aquatic environment via a second dedicated output that is separate from the first dedicated output.

20. The method of claim 15, wherein the operation data of the aquatic vessel comprises a location of the aquatic vessel, and the activating the distribution comprises distributing the nutrient solution, the diluted contents, or both from the aquatic vessel to the aquatic environment based on the location of the aquatic vessel.

* * * * *